(12) United States Patent
Suzuki et al.

(10) Patent No.: US 9,035,580 B2
(45) Date of Patent: May 19, 2015

(54) AC MOTOR CONTROL APPARATUS

(71) Applicant: DENSO CORPORATION, Kariya, Aichi-pref. (JP)

(72) Inventors: Takashi Suzuki, Anjo (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 13/867,319

(22) Filed: Apr. 22, 2013

(65) Prior Publication Data

US 2013/0278186 A1    Oct. 24, 2013

(30) Foreign Application Priority Data

Apr. 22, 2012 (JP) .................................. 2012-97222

(51) Int. Cl.
*H02P 21/00* (2006.01)
*H02P 21/14* (2006.01)

(52) U.S. Cl.
CPC ....................................... *H02P 21/14* (2013.01)

(58) Field of Classification Search
CPC ........ H02P 21/00; H02P 29/077; H02P 29/00
USPC .............. 318/801, 811, 798, 799, 254.1, 437, 318/400.02
See application file for complete search history.

(56) References Cited

U.S. PATENT DOCUMENTS

| | | | | |
|---|---|---|---|---|
| 6,163,130 A | * | 12/2000 | Neko et al. ..................... | 318/806 |
| 6,229,719 B1 | * | 5/2001 | Sakai et al. ..................... | 363/37 |
| 7,598,698 B2 | * | 10/2009 | Hashimoto et al. ........... | 318/801 |
| 8,362,759 B2 | * | 1/2013 | Ha et al. ..................... | 324/76.15 |
| 2008/0079385 A1 | | 4/2008 | Hashimoto et al. | |
| 2011/0221368 A1 | * | 9/2011 | Yabuguchi ............... | 318/400.02 |

FOREIGN PATENT DOCUMENTS

| | | |
|---|---|---|
| JP | 9-215397 | 8/1997 |
| JP | 09215397 A * | 8/1997 |
| JP | 2004-159391 | 6/2004 |
| JP | 2008-050075 | 3/2008 |

OTHER PUBLICATIONS

Suzuki, U.S. Appl. No. 13/867,687, filed Apr. 22, 2013.

(Continued)

*Primary Examiner* — Rina Duda
*Assistant Examiner* — Bickey Dhakal
(74) *Attorney, Agent, or Firm* — Nixon & Vanderhye P.C.

(57) ABSTRACT

A control apparatus for a three-phase AC motor includes a current sensor and a current estimation section. The current sensor detects current flowing through one phase of the motor. The current estimation section repeats dq transformation and inverse dq transformation in a predetermined cycle. In the dq transformation, a d-axis current estimation value and a q-axis current estimation value in a rotating coordinate system of the AC motor are calculated based on the detected current and a previous current estimation value of another phase of the AC motor. In the inverse dq transformation, a present current estimation value of the other phase to be obtained at a time of angle advance of one period of the cycle is calculated based on smoothed values of the d-axis current estimation value and the q-axis current estimation value.

6 Claims, 9 Drawing Sheets

(56) References Cited

OTHER PUBLICATIONS

Suzuki, U.S. Appl. No. 13/867,297, filed Apr. 22, 2013.
Suzuki, U.S. Appl. No. 13/867,392, filed Apr. 22, 2013.
Suzuki, U.S. Appl. No. 13/867,282, filed Apr. 22, 2013.

Office Action (2 pages) dated Mar. 20, 2014 issued in corresponding Japanese Application No. 2012-097222 and English translation (2 pages).
Advisory Action (1 page) dated Nov. 4, 2014 issued in corresponding Japanese Application No. 2012-097222 and English translation (1 page).

* cited by examiner

US 9,035,580 B2

AC MOTOR CONTROL APPARATUS

CROSS REFERENCE TO RELATED APPLICATION

This application is based on Japanese Patent Application No. 2012-97222 filed on Apr. 22, 2012, the contents of which are incorporated herein by reference.

FIELD

The present disclosure relates to a control apparatus for controlling a three-phase AC motor by using a current sensor that detects an electric current flowing through one of three phases of the AC motor.

BACKGROUND

In recent years, from social demands for low-fuel consumption and low exhaust emission, there has been an increased attention to an electric vehicle or a hybrid vehicle which has an alternate-current (AC) motor to run. For example, in a hybrid vehicle, an AC motor is connected to a direct-current (DC) power source such as a rechargeable battery unit through a power converter such as an inverter. The inverter converts a DC voltage supplied from the DC power source to an AC voltage and drives the AC motor with the AC voltage.

A typical control system for controlling an AC motor mounted on an electric vehicle or a hybrid vehicle uses two or three current sensors to detect two or three of three phases of the AC motor. The AC motor is controlled based on outputs (i.e., current detection values) of the current sensors. In this type of motor control system, two or three current sensors are provided to one AC motor. Therefore, the size and cost of the control system may be increased.

U.S. Pat. No. 6,229,719 corresponding to JP-A-2001-145398 discloses a technique for reducing the number of current sensors in an AC motor control system, thereby reducing the cost of the AC motor control system. In the technique, one current sensor is provided to detect a current of one (e.g., U-phase) of three phases of an AC motor. A d-axis current estimation value (i.e., exciting current component estimation value) and a q-axis current estimation value (i.e., torque current component estimation value) in a rotating coordinate system of the AC motor are calculated based on the detected current and the previous current estimation values of the other phases (e.g., V-phase and W-phase). Each of the d-axis current estimation value and the q-axis current estimation value is averaged by the first-order lag filter. The present current estimation values of the other phases are calculated based on the averaged values. The AC motor is controlled by using the q-axis current estimation value (or both the d-axis current estimation value and the q-axis current estimation value).

The technique disclosed in U.S. Pat. No. 6,229,719 uses one current sensor for one AC motor, thereby reducing the size and cost of the inverter. However, depending on operation conditions, it may be difficult or impossible to ensure adequate current estimation accuracy of the AC motor. As a result, accuracy of output torque may be reduced, current control may become unstable, and torque variation may occur. Further, abnormal current or voltage may occur, and the AC motor and the inverter may be broken due to the abnormal current or voltage. Therefore, it is important to ensure adequate current estimation accuracy of the AC motor. In particular, since the electric vehicle and the hybrid vehicle have various operation conditions including a stopped condition, a high-speed running condition, a no-driving force output condition, and a rated torque output condition of the AC motor, it is very important to ensure adequate current estimation accuracy of the AC motor.

SUMMARY

In view of the above, it is an object of the present disclosure to provide a control apparatus for increasing current estimation accuracy in an AC motor by using a current sensor that detects an electric current flowing through one of phases of the AC motor.

According to an aspect of the present disclosure, a control apparatus for controlling a three-phase AC motor includes a current sensor and a current estimation section. The current sensor detects electric current flowing through one phase of the AC motor. The one phase is defined as a sensor phase. The current estimation section repeatedly performs dq transformation and inverse dq transformation in a predetermined calculation cycle. In the dq transformation, a d-axis current estimation value and a q-axis current estimation value in a rotating coordinate system of the AC motor are calculated based on the current detected by the current sensor and a previous current estimation value of another phase of the AC motor. In the inverse dq transformation, a present current estimation value of the other phase to be obtained at a time of angle advance of one period of the calculation cycle is calculated based on a smoothed d-axis current estimation value and a smoothed q-axis current estimation value into which the d-axis current estimation value and the q-axis current estimation value are respectively smoothed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 8A:
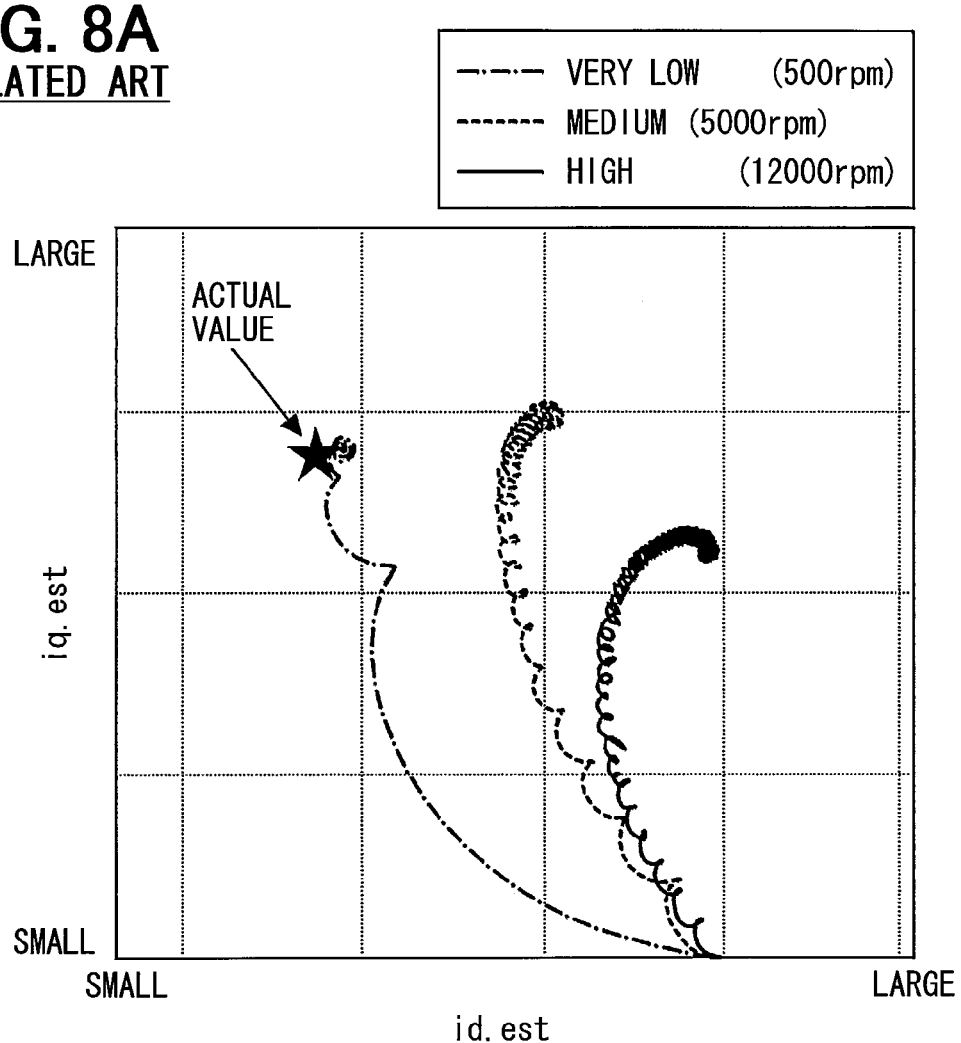
FIG. 8A is a diagram illustrating behaviors of d-axis and q-axis current estimation values calculated by the current estimation according to the comparison example.
Figure 8B:
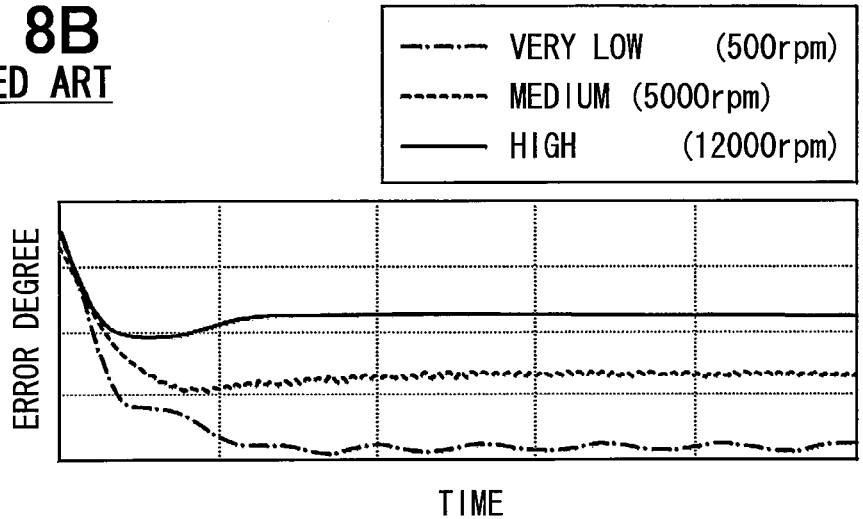
FIG. 8B is a diagram illustrating degree of an estimation error according to the comparison example.

The present inventors conducted an experiment to determine whether a motor control system that employs the technique disclosed in U.S. Pat. No. 6,229,719 can accurately estimate a d-axis current value and a q-axis current value. The experiment was started from an initial state where a d-axis current estimation value and a q-axis current estimation value are zero under a condition that the d-axis current value and the q-axis current value are kept constant. In the system used in the experiment, the d-axis current estimation value and the q-axis current estimation value are calculated based on a current, which is detected by a current sensor, of one of phases of an AC motor and the previous current estimation values of the other phases of the AC motor, and then the current estimation values of the other phases are calculated based on smoothed values of the d-axis current estimation value and the q-axis current estimation value. FIGS. 8A and 8B show a result of the experiment. As shown in FIGS. 8A and 8B, in the system, when a rotation speed of an AC motor becomes higher, the current estimation values deviate in a direction in which a phase lag becomes larger and a current absolute value becomes smaller. That is, the experiment result indicates that a stationary estimation error increases with an increase in the rotation speed of the AC motor.

After a deeply study on the experiment result, the present inventors found out that the increase in the stationary estimation error is caused by a phase lag of the previous current estimation values of the other phases used to calculate the d-axis current estimation value and the q-axis current estimation value. Specifically, the current estimation values of the other phases are in synchronism with a rotation angle of the AC motor. The rotation angle changes between the previous process and the present process. Therefore, the previous current estimation values of the other phases lag in phase by the change in the rotation angle with respect to the current value, which is presently detected by the current sensor, of the one phase. Therefore, when the d-axis current estimation value and the q-axis current estimation value are calculated by dq transformation based on the presently detected current value of the one phase and the previously estimated current values of the other phases, an estimation error occurs due to the phase lag between the current detection value of the one phase and the current estimation values of the other phases. The estimation error is not corrected and results in a stationary estimation error.

An embodiment of the present disclosure based on the above study is described below with reference to the drawings. Throughout the embodiment, the term "current" means "electric current". In other words, the term "current" does not mean "present".

A driving system of a hybrid vehicle according to an embodiment of the present disclosure is described below with reference to FIG. 1. An internal-combustion engine 1, a first alternating-current (AC) motor 13A, and a second AC motor 13B are mounted on the vehicle. Wheels 2 of the vehicle are driven by driving force of the second AC motor 13B and driving force that is transmitted to a rotating shaft of the second AC motor 13B by driving the first AC motor 13A against an output of the engine 1. A crankshaft of the engine 1, a rotating shaft of the first AC motor 13A, and the rotating shaft of the second AC motor 13B are coupled together through a mechanical power distribution mechanism 3 (e.g., planetary gear mechanism). The rotating shaft of the second AC motor 13B is coupled through a differential reduction gear 4 to an axle 5 of the vehicle. The AC motors 13A and 13B are connected to a direct-current (DC) power source 11, such as a rechargeable battery unit, through a motor controller 6. The motor controller 6 includes an inverter 12 (refer to FIG. 2) and a motor controlling circuit 16 (refer to FIG. 2). The AC motors 13A and 13B are supplied with electrical power from the DC power source 11 through the motor controller 6.

A driving force calculator 7 is provided by a computer that performs overall control of the vehicle. The driving force calculator 7 detects operating conditions of the vehicle based on signals received from sensors and switches. For example, the driving force calculator 7 can detect the operating conditions based on a brake signal from a brake sensor (not shown), an accelerator signal from an accelerator sensor (not shown), and a shift signal from a shift switch (not shown). The driving force calculator 7 exchanges control signals and data signals with an engine controller (not shown), which controls operations of the engine 1, and a motor controlling circuit 16 (refer to FIG. 2), which controls operations of the AC motors 13A and 13B. The driving force calculator 7 outputs a driving force command according to the operation conditions of the vehicle, thereby controlling driving forces of the engine 1 and the AC motors 13A and 13B.

Figure 2:
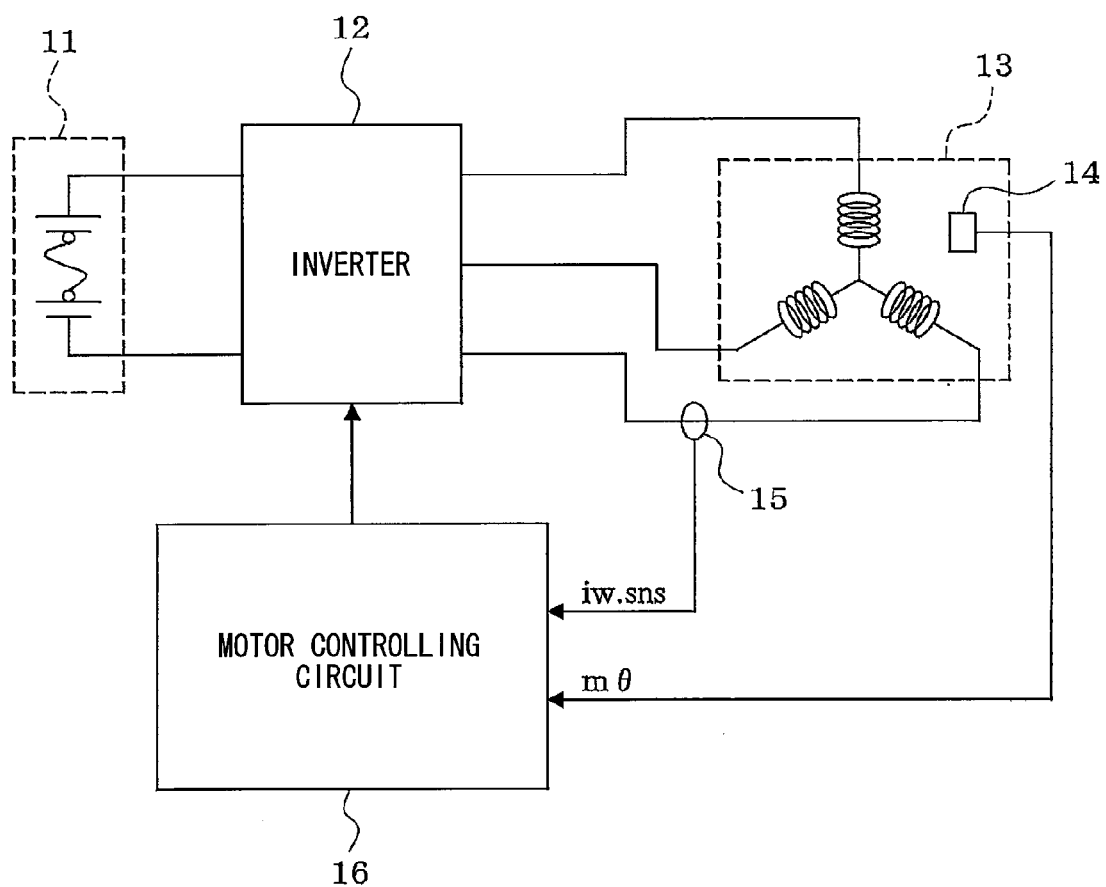
FIG. 2 is a block diagram of an AC motor control system according to the embodiment.

Next, an AC motor control system mounted on the vehicle is described with reference to FIG. 2. It is noted that a motor control system for controlling the AC motor 13A is substantially identical to a motor control system for controlling the AC motor 13B. For the sake of simplicity, the AC motors 13A and 13B are hereinafter collectively referred to as the "AC motor 13", and a motor control system for controlling the AC motor 13 is described below.

The inverter 12 is connected to the DC power source 11. The inverter 12 is a voltage-controlled three-phase inverter. The AC motor 13 is driven by the inverter 12. A boost converter (i.e., step-up converter) can be interposed between the DC power source 11 and the inverter 12.

The AC motor 13 is a permanent magnet three-phase synchronous motor having a permanent magnet built in a rotor. The AC motor 13 includes a rotor position sensor 14 for detecting a rotation position of the rotor. The AC motor 13 is provided with one current sensor 15 for detecting an electric current flowing through one (hereinafter referred to as the "sensor phase") of phases of the AC motor 13. According to the embodiment, the sensor phase is a W phase, and the current sensor 15 detects the current flowing though the W phase of the AC motor 13.

The inverter 12 converts a DC voltage to three phase AC voltages U, V, and W based on leg voltage command signals UU, UL, VU, VL, WU, and WL outputted from the motor controlling circuit 16. The leg voltage command signal UU is applied to an upper switch of a U-phase leg of the inverter 12. The leg voltage command signal UL is applied to a lower switch of the U-phase leg. The leg voltage command signal VU is applied to an upper switch of a V-phase leg of the inverter 12. The leg voltage command signal VL is applied to a lower switch of the V-phase leg. The leg voltage command signal WU is applied to an upper switch of a W-phase leg of the inverter 12. The leg voltage command signal WL is applied to a lower switch of the W-phase leg.

The motor controlling circuit 16 performs torque control. In the torque control, the motor controlling circuit 16 adjusts the AC voltage applied to the AC motor 13 by controlling the inverter 12 in such a manner that an output torque of the AC motor 13 can be equal to a target torque (i.e., torque command value). Specifically, in the torque control, the motor controlling circuit 16 performs current feedback control. In the current feedback control, energization of the AC motor 13 is feedback-controlled so that a deviation between a current command value, which depends on the torque command value, and a current estimation value, which depends on an output of the current sensor 15, can be reduced. The current feedback control is described in detail below.

Figure 3:
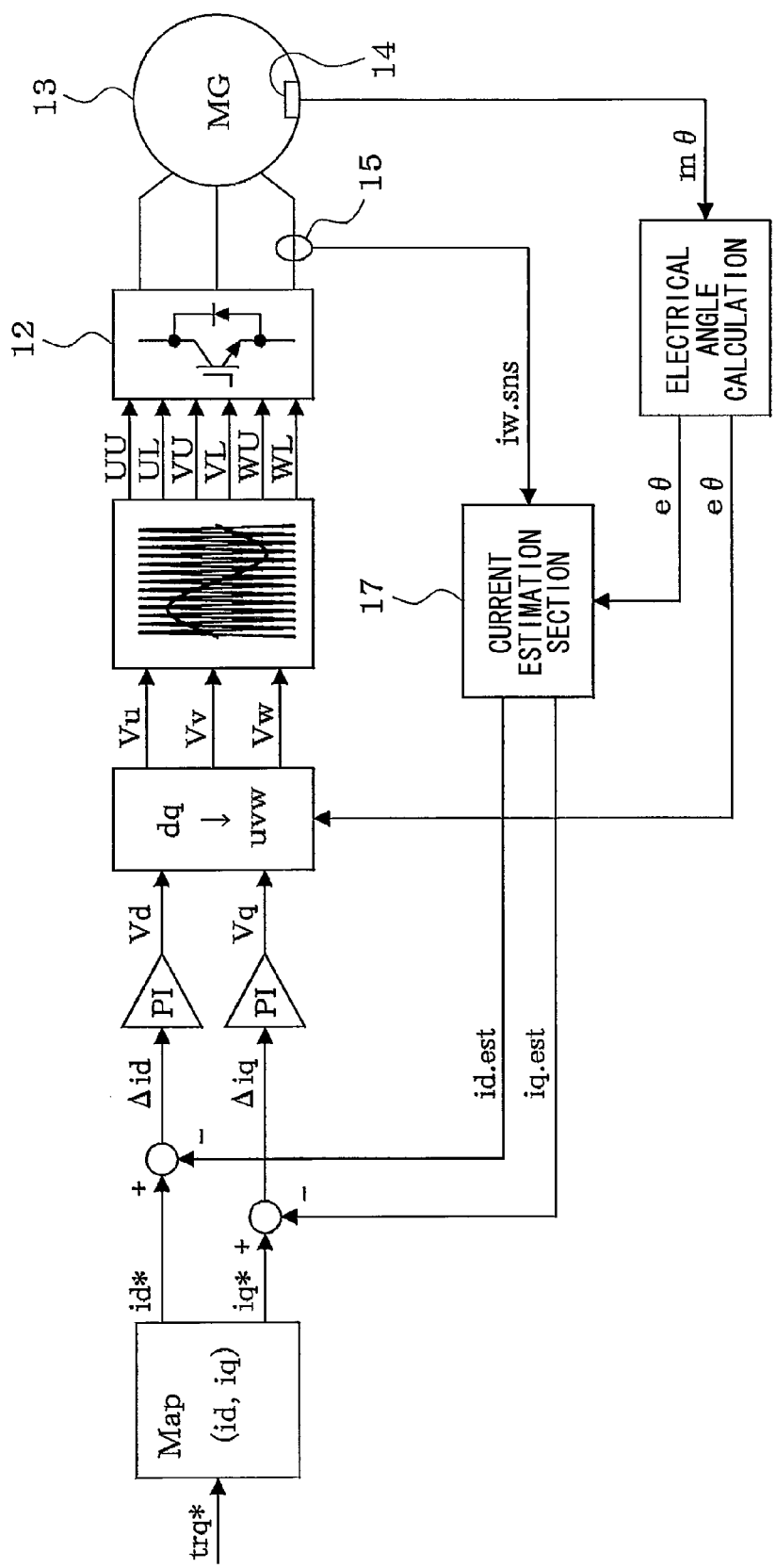
FIG. 3 is a block diagram explaining a current feedback control of an AC motor according to the embodiment.

As shown in FIG. 3, the motor controlling circuit 16 calculates a command current vector (i.e., d-axis current command value id* and a q-axis current command value iq*), which is defined in a rotating coordinate system (i.e., dq coordinate system) set as a rotor coordinate system of the AC motor 13, based on a torque command value trq* by using a mapping table, a formula, or the like.

Further, the motor controlling circuit 16 calculates an electrical angle eθ based on a rotor rotation position me of the AC motor 13 detected by the rotor position sensor 14. Further, a current estimation section 17 of the motor controlling circuit 16 calculates an estimated current vector (i.e., d-axis current estimation value id.est and a q-axis current estimation value iq.est), which are defined in the rotating coordinate system, based on the electrical angle eθ and a current detection value iw.sns detected by the current sensor 15. The current detection value indicates the current flowing though the sensor phase (i.e., W-phase) of the AC motor 13.

Then, a d-axis voltage command value Vd is calculated, for example, by proportional-integral (PI) control, so that a deviation Δid between the d-axis current command value id* and the d-axis current estimation value id.est can be reduced. Further, a q-axis voltage command value Vq is calculated, for example, by PI control, so that a deviation Δiq between the q-axis current command value iq* and the q-axis current estimation value iq.est can be reduced. In this way, a command voltage vector (i.e., the d-axis voltage command value Vd and the q-axis voltage command value Vq) is calculated.

Then, three-phase voltage command values Vu, Vv, and Vw are calculated based on the command voltage vector (i.e., the d-axis voltage command value Vd and the q-axis voltage command value Vq) and the electrical angle eθ. Then, the three-phase voltage command values Vu, Vv, and Vw are converted to the leg voltage command signals UU, UL, VU, VL, WU, and WL, for example, by sinusoidal PWM control or square wave control. Then, the leg voltage command signals UU, UL, VU, VL, WU, and WL are outputted to the inverter 12. In this way, the motor controlling circuit 16 performs the current feedback control so that the energization of the AC motor 13 can be feedback-controlled in such a manner that the deviations between the current command values id* and iq*, which depend on the torque command value, and the current estimation values id.est and iq.est, which depend on the output of the current sensor 15, can be reduced, respectively.

Figure 7:
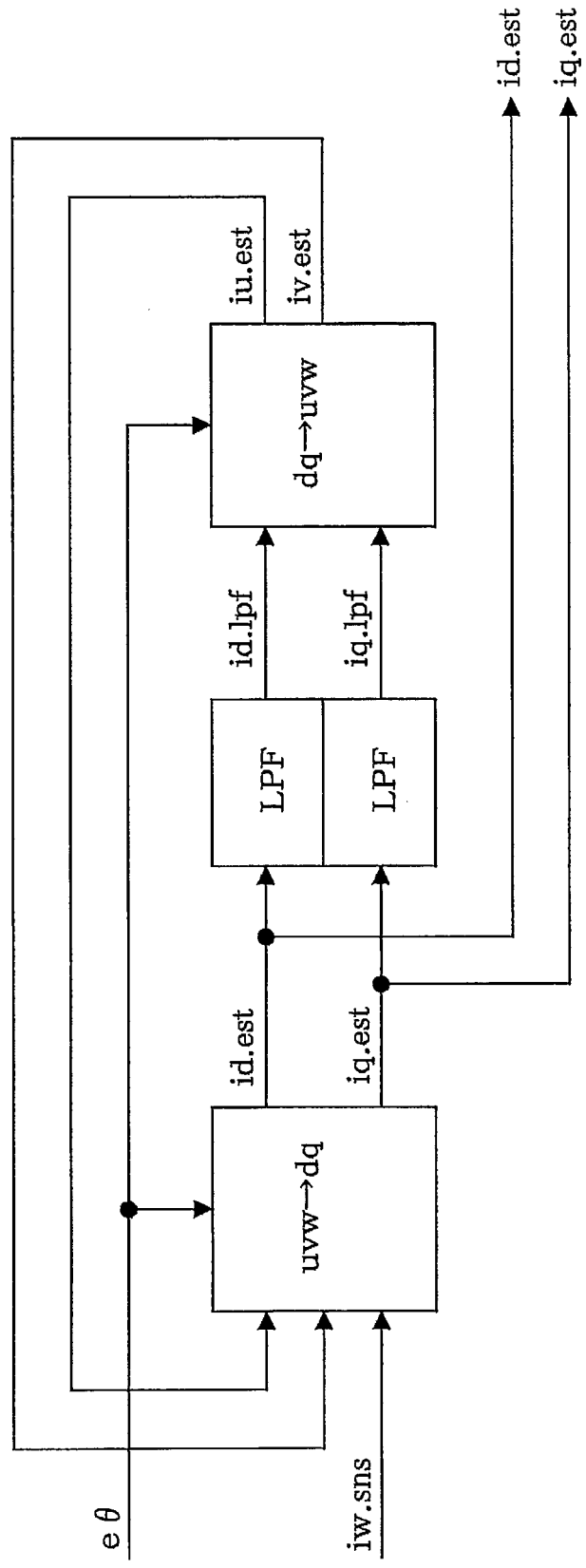
FIG. 7 is a block diagram explaining current estimation according to a comparison example.

FIG. 7 shows a system according to a comparison example studied by the present inventors. The system repeatedly performs a current estimation process in a predetermined cycle to estimate current estimation values iu.est and iv.est of the other phases (i.e., U-phase and V-phase). In the current estimation process, the d-axis current estimation value id.est and the q-axis current estimation value iq.est are calculated based on the current detection value iw.sns, which is detected by the current sensor 15, of the sensor phase (i.e., W-phase) and the previous current estimation values iu.est and iv.est of the other phases (i.e., U-phase and V-phase). Then, the d-axis current estimation value id.est and the q-axis current estimation value iq.est are smoothed by LPF processing, and the current estimation values iu.est and iv.est are calculated based on the smoothed values. The LPF processing is a process using a low-pass filter. Examples of the LPF processing can include an averaging process and a first-order lag process. In this system, although the d-axis current estimation value id.est and the q-axis current estimation value iq.est are calculated from the current detection value iw.sns and the previous current estimation values iu.est and iv.est, the previous current estimation values iu.est and iv.est lag in phase behind the current detection value iw.sns.

Therefore, as shown in FIGS. 8A and 8B, the influence of the phase-lag of the previous current estimation values iu.est and iv.est with respect to the current detection value iw.sns becomes larger as the current frequency (i.e., motor rotation speed) becomes higher. Accordingly, a stationary error (i.e., estimation error) between each of the d-axis current estimation value id.est and the q-axis current estimation value iq.est and a corresponding actual value becomes larger so that current estimation accuracy can be reduced.

Figure 4:
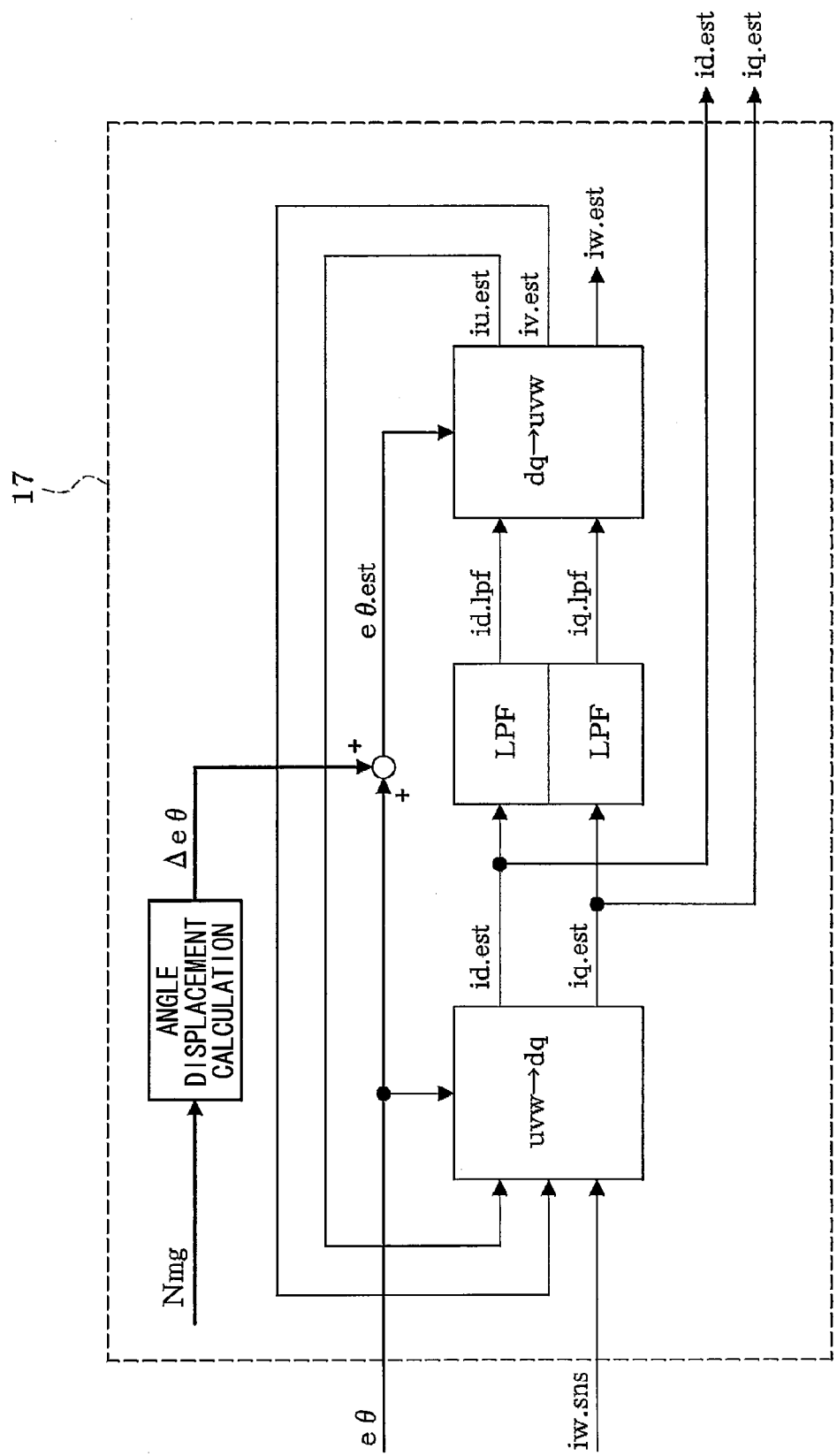
FIG. 4 is a block diagram of a current estimation section according to the embodiment.

Based on the above study findings, according to the embodiment, as shown in FIG. 4, dq transformation and inverse dq transformation are repeatedly performed in a predetermined calculation cycle T. In the dq transformation, the d-axis current estimation value id.est and the q-axis current estimation value iq.est are calculated based on the current detection value iw.sns, which is detected by the current sensor 15, of the sensor phase (i.e., W-phase) and the previous current estimation values iu.est and iv.est of the other phases (i.e., U-phase and V-phase). In the inverse dq transformation, the current estimation values iu.est and iv.est of the other phases (i.e., U-phase and V-phase) are calculated based on a smoothed d-axis current estimation value id.lpf and a smoothed q-axis current estimation value iq.lpf into which the d-axis current estimation value id.est and the q-axis current estimation value iq.est are respectively smoothed by the LPF processing (e.g., averaging process or a first-order lag process). Specifically, in the inverse dq transformation, the current estimation values iu.est and iv.est of the other phases (i.e., U-phase and V-phase) to be obtained when the angle is advanced by one period of the calculation cycle T are calculated in the following ways.

Firstly, an electrical angle displacement Δeθ for one period of the calculation cycle T is calculated based on the rotation speed Nmg of the AC motor 13 and the calculation cycle T. Next, a predicted electrical angle eθ.est is calculated by adding the electrical angle displacement Δeθ to the present electrical angle eθ. That is, the predicted electrical angle eθ.est is advanced with respect to the present electrical angle eθ by one period of the calculation cycle T. Then, the inverse dq transformation is performed by suing the predicted electrical angle eθ.est. In this way, the current estimation values iu.est and iv.est of the other phases (i.e., U-phase and V-phase) to be obtained when the angle is advanced by one period of the calculation cycle T are calculated. Alternatively, in the inverse dq transformation, the current estimation values iu.est iv.est, and iw.est of all phases (i.e., U-phase, V-phase, and W-phase) can be calculated.

As described above, according to the embodiment, the current estimation values iu.est and iv.est of the other phases (i.e., U-phase and V-phase) to be obtained at the next calculation timing (i.e., at the time when the angle is advanced by one period of the calculation cycle T) can be calculated (i.e., predicted) at the present calculation timing. Accordingly, at the next calculation timing, the current detection value iw.sns, which is detected by the current sensor 15, of the sensor phase can be in phase with the previous current estimation values iu.est and iv.est of the other phases. Thus, the phase lag of the previous current estimation values iu.est and iv.est with respect to the current detection value iw.sns is eliminated so that the estimation error due to the phase lag can be avoided. Therefore, accuracy of the d-axis current estimation value id.est, the q-axis current estimation value iq.est, and the current estimation values iu.est and iv.est of the other phases (or the current estimation values iu.est, iv.est, and iw.est of all phases) can be increased.

Figure 5:
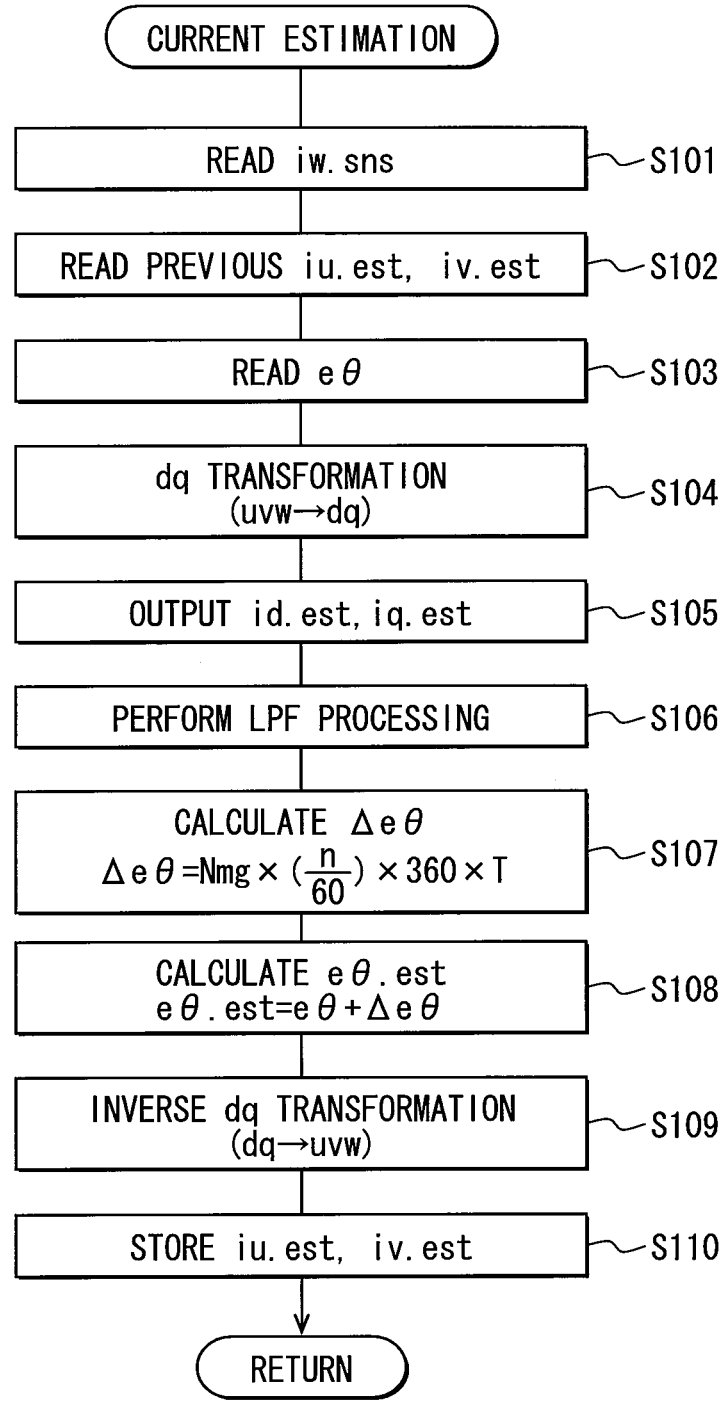
FIG. 5 is a flow chart of a current estimation routine according to the embodiment.

The above-described current estimation is performed by the motor controlling circuit 16 in accordance with a current estimation routine shown in FIG. 5. The current estimation routine is described below.

When the motor controlling circuit 16 is powered ON, the motor controlling circuit 16 repeatedly executes the current estimation routine in a predetermined calculation cycle T. The current estimation routine starts at S101, where the motor controlling circuit 16 reads the current detection value iw.sns, which is detected by the current sensor 15, of the sensor phase (i.e., W-phase).

Then, the current estimation routine proceeds to S102, where the motor controlling circuit 16 reads the previous current estimation values iu.est and iv.est of the other phases (i.e., U-phase and V-phase).

It is noted that the inverter 12 still remains OFF immediately after the motor controlling circuit 16 is powered ON. Therefore, when the current estimation routine is performed for the first time after the motor controlling circuit 16 is powered ON, predetermined initial values are used as the previous current estimation values iu.est and iv.est. According to the embodiment, each of the initial values of the previous current estimation values iu.est and iv.est is zero.

Then, the current estimation routine proceeds to S103, where the motor controlling circuit 16 reads the electrical angle eθ, which is calculated based on the rotor rotation position me detected by the rotor position sensor 14.

Then, the current estimation routine proceeds to S104, where the motor controlling circuit 16 calculates the d-axis current estimation value id.est and the q-axis current estimation value iq.est by dq transformation based on the current detection value iw.sns and the previous current estimation values iu.est and iv.est. In the dq transformation, the d-axis current estimation value id.est and the q-axis current estimation value iq.est are calculated by using the following formula (1):

$$\begin{bmatrix} id.est \\ iq.est \end{bmatrix} = \begin{bmatrix} cosa(e\theta) & \cos(e\theta - 120°) & \cos(e\theta + 120°) \\ -\sin(e\theta) & -\sin(e\theta - 120°) & -\sin(e\theta + 120°) \end{bmatrix} \begin{bmatrix} iu.est \\ iv.est \\ iw.sns \end{bmatrix} \quad (1)$$

Alternatively, at S104, the motor controlling circuit 16 can calculate the d-axis current estimation value id.est and the q-axis current estimation value iq.est by dq transformation based on the current detection value iw.sns of the sensor phase (i.e., W-phase) and one of the previous current estimation values of the other phases (i.e., U-phase and V-phase). For example, when the d-axis current estimation value id.est and the q-axis current estimation value iq.est are calculated based on the current detection value iw.sns of the sensor phase (i.e., W-phase) and the previous current estimation value iu.est of the U-phase, the following formula (2) is used in the dq transformation:

$$\begin{bmatrix} id.est \\ iq.est \end{bmatrix} = \sqrt{2} \begin{bmatrix} \sin(e\theta + 120°) & -\sin(e\theta) \\ \cos(e\theta + 120°) & -\cos(e\theta) \end{bmatrix} \begin{bmatrix} iu.est \\ iw.sns \end{bmatrix} \quad (2)$$

Then, the current estimation routine proceeds to S105, where the motor controlling circuit 16 outputs the present d-axis current estimation value id.est and the present q-axis current estimation value iq.est. For example, the d-axis current estimation value id.est and the q-axis current estimation value iq.est, which are outputted at S105, can be used in the current feedback control.

Then, the current estimation routine proceeds to S106, where the motor controlling circuit 16 performs the LPF process so that the d-axis current estimation value id.est and the q-axis current estimation value iq.est can be respectively smoothed into a smoothed d-axis current estimation value id.lpf and a smoothed q-axis current estimation value iq.lpf.

Then, the current estimation routine proceeds to S107, where the motor controlling circuit 16 calculates an electrical angle displacement Δeθ for one period of the calculation cycle T based on a rotation speed Nmg of the AC motor 13 and the calculation cycle T by using the following formula: Δeθ=Nmg×(n/60)×360×T, where "n" represents the number of pole pairs of the AC motor 13. The rotation speed Nmg is calculated from the output of the rotor position sensor 14.

Then, the current estimation routine proceeds to S108, where the motor controlling circuit 16 calculates a predicted electrical angle eθ.est by adding the electrical angle displacement Δeθ to the present electrical angle eθ. That is, the predicted electrical angle eθ.est is advanced with respect to the present electrical angle eθ by one period of the calculation cycle T and given as follows: eθ.est=eθ+Δeθ.

Then, the current estimation routine proceeds to S109, where the motor controlling circuit 16 calculates the current estimation values iu.est and iv.est of the other phases (i.e., U-phase and V-phase) by inverse dq transformation based on the smoothed d-axis current estimation value id.lpf and the smoothed q-axis current estimation value iq.lpf. In the inverse dq transformation, the predicted electrical angle eθ.est is used as shown in the following formula (3) to calculate the current estimation values iu.est and iv.est of the other phases (i.e., U-phase and V-phase) to be obtained when (i.e., at the next calculation timing) the angle is advanced by one period of the calculation cycle T.

$$\begin{bmatrix} iu.est \\ iv.est \end{bmatrix} = \sqrt{\frac{2}{3}} \begin{bmatrix} \cos(e\theta.est) & -\sin(e\theta.est) \\ \cos(e\theta.est - 120°) & -\sin(e\theta.est - 120°) \end{bmatrix} \begin{bmatrix} id.lpf \\ iq.lpf \end{bmatrix} \quad (3)$$

Alternatively, at S109, the motor controlling circuit 16 can calculate the current estimation values iu.est, iv.est, and iw.est of all phases (i.e., U-phase, V-phase, and W-phase) by using the following formula (4):

$$\begin{bmatrix} iu.est \\ iv.est \\ iw.est \end{bmatrix} = \sqrt{\frac{2}{3}} \begin{bmatrix} \cos(e\theta.est) & -\sin(e\theta.est) \\ \cos(e\theta.est - 120°) & -\sin(e\theta.est - 120°) \\ \cos(e\theta.est + 120°) & -\sin(e\theta.est + 120°) \end{bmatrix} \begin{bmatrix} id.lpf \\ iq.lpf \end{bmatrix} \quad (4)$$

Then, the current estimation routine proceeds to S110, where the motor controlling circuit 16 stores the current estimation values iu.est and iv.est of the other phases (or the current estimation values iu.est, iv.est, and iw.est of all phases) in a buffer (data storage area). After S110, the current estimation routine is ended. The current estimation values stored in the buffer are used as the previous current estimation values when the current estimation routine is executed next time (i.e., when the current estimation is performed next time).

As described above, according to the embodiment of the present disclosure, the dq transformation and the inverse dq transformation are repeatedly performed in the predetermined calculation cycle T. In the dq transformation, the d-axis current estimation value id.est and the q-axis current estimation value iq.est are calculated based on the current detection value iw.sns, which is detected by the current sensor 15, of the sensor phase (i.e., W-phase) and the previous current estimation values iu.est and iv.est of the other phases (i.e., U-phase and V-phase). In the inverse dq transformation, the current estimation values iu.est and iv.est of the other phases (i.e., U-phase and V-phase) to be obtained when the angle is advanced by one period of the calculation cycle T are calculated based on the smoothed d-axis current estimation value id.lpf and the smoothed q-axis current estimation value iq.lpf, into which the d-axis current estimation value id.est and the q-axis current estimation value iq.est are respectively smoothed by the LPF process.

In such an approach, the current estimation values iu.est and iv.est of the other phases (i.e., U-phase and V-phase) to be obtained at the next calculation timing (i.e., at the time when the angle is advanced by one period of the calculation cycle T) can be calculated (i.e., predicted) at the present calculation timing. Accordingly, at the next calculation timing, the current detection value iw.sns, which is detected by the current sensor 15, of the sensor phase can be in phase with the previous current estimation values iu.est and iv.est of the other phases. Thus, the phase lag of the previous current estimation values iu.est and iv.est with respect to the current detection value iw.sns is eliminated so that the estimation error due to the phase lag can be avoided.

Figure 6A:
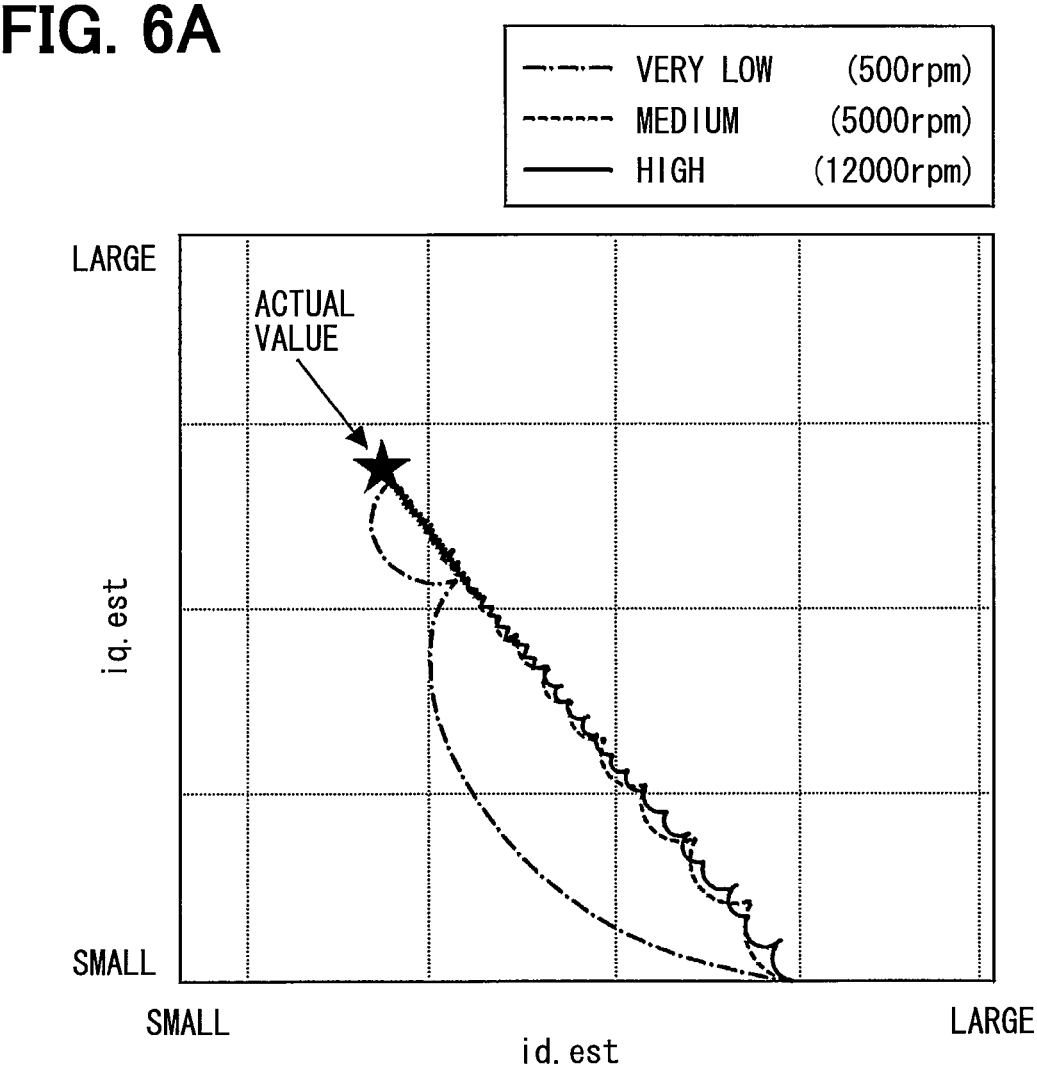
FIG. 6A is a diagram illustrating behaviors of d-axis and q-axis current estimation values calculated by current estimation according to the embodiment.
Figure 6B:
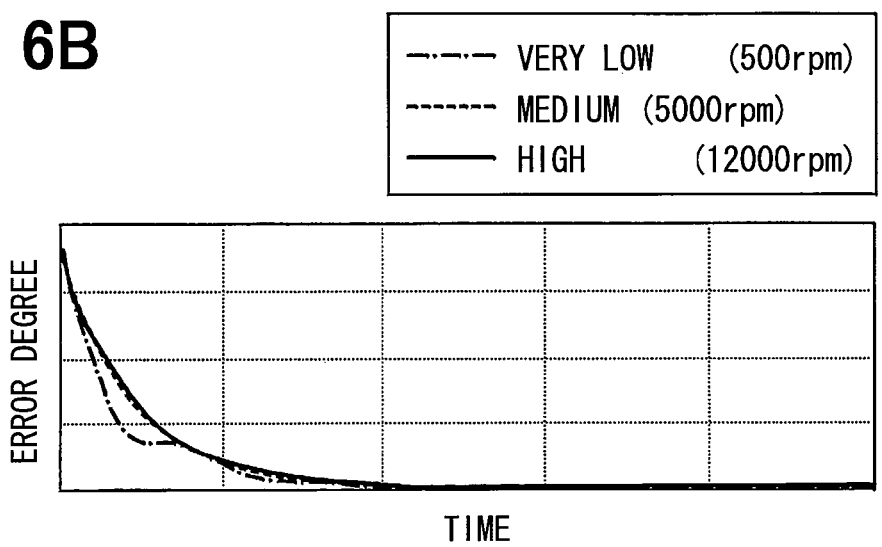
FIG. 6B is a diagram illustrating degree of an estimation error according to the embodiment.

Therefore, as shown in FIGS. 6A and 6B, even when the current frequency (i.e., motor rotation speed) becomes high, the stationary error (i.e., estimation error) of the d-axis current estimation value id.est and the q-axis current estimation value iq.est with respect to the corresponding actual value is maintained small so that the accuracy of the d-axis current estimation value id.est, the q-axis current estimation value iq.est, and the current estimation values iu.est and iv.est of the other phases (or the current estimation values iu.est, iv.est, and iw.est of all phases) can be increased. In this way, the current estimation accuracy of the AC motor 13 can be improved while satisfying the demand for the reduction in size and cost of the inverter by using one current sensor 15 in one AC motor 13.

Further, according to the embodiment, the energization of the AC motor 13 is feedback controlled based on the d-axis current estimation value id.est and the q-axis current estimation value iq.est that are calculated with an increased accuracy. In such an approach, a reduction in accuracy of output torque of the AC motor 13 is prevented so that the current feedback control can be stabilized.

Further, according to the embodiment, the energization of the AC motor 13 is feedback-controlled based on the d-axis current estimation value id.est and the q-axis current estimation value iq.est that are directly estimated. In such an approach, electrical second-order variation in output torque due to a difference in gain between multiple current sensors can be perfectly prevented in principle. Specifically, the electrical second-order variation is caused by the fact that the d-axis and q-axis current values vibrate at an electrical second-order frequency.

As described above, according to the embodiment, even when one current sensor 15 is used in one AC motor 13, the reduction in accuracy of the current estimation is reduced so that the torque variation (e.g., electrical first-order variation due to a direct current component of three-phase current) can be reduced. Thus, vibration of an apparatus to which an AC motor control system that uses one current sensor in one AC motor is applied is reduced. Therefore, the embodiment can be effectively applied to, in particular, a motor mounted on a vehicle to provide comfortable ride and high driving performance of the vehicle.

Further, according to the embodiment, in the inverse dq transformation, the predicted electrical angle eθ.est which is advanced with respect to the present electrical angle eθ by one period of the calculation cycle T is used to calculate the current estimation values iu.est and iv.est of the other phases to be obtained when the angle is advanced by one period of the calculation cycle T. In such an approach, the current estimation values iu.est and iv.est of the other phases (i.e., U-phase and V-phase) to be obtained at the next calculation timing (i.e., at the time when the angle is advanced by one period of the calculation cycle T) can be accurately calculated by a simple method.

Further, according to the embodiment, the electrical angle displacement Δeθ for one period of the calculation cycle T is calculated based on the rotation speed Nmg of the AC motor 13 and the calculation cycle T, and the predicted electrical angle eθ.est is calculated by adding the electrical angle displacement Δeθ to the present electrical angle eθ. In such an approach, the predicted electrical angle eθ.est, which is advanced with respect to the present electrical angle eθ by one period of the calculation cycle T, can be calculated accurately.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiment, the electrical angle displacement Δeθ is calculated using the rotation speed Nmg which is calculated directly from the output of the rotor position sensor 14. Alternatively, the rotation speed Nmg can be calculated from an average of the outputs of the rotor position sensor 14 for several periods.

In the embodiment, the electrical angle displacement Δeθ is calculated from the rotation speed Nmg and the calculation cycle T. Alternatively, the electrical angle displacement Δeθ can be calculated by subtracting a previous electrical angle Δeθ0 from the present electrical angle eθ as follows: Δeθ=eθ−eθ0

Further, the electrical angle displacement Δeθ can be an average for several periods to reduce influence of a detection error of the electrical angle displacement Δeθ (i.e., to reduce influence of a detection error of the rotor rotation position me detected by the rotor position sensor 14).

In the embodiment, the current feedback control of the AC motor 13 is performed based on the d-axis current estimation value id.est and the q-axis current estimation value iq.est to increase accuracy and responsiveness of the current feedback control. Alternatively, the current feedback control can be performed based on the smoothed d-axis current estimation value id.lpf and the smoothed q-axis current estimation value iq.lpf, into which the d-axis current estimation value id.est and the q-axis current estimation value iq.est are respectively smoothed by the LPF process.

In such an approach, the sensitivity of the current feedback control to motor current distortion and noise on the current detection value is reduced so that the operation of the AC motor 13 can be stabilized.

Whether or not the current feedback control is performed based on the smoothed current estimation values can be selected according to operating conditions of the AC motor 13. For example, in an unsteady condition where the torque command value will change sharply, it is preferable that the current feedback control of the AC motor 13 be performed based on the d-axis current estimation value id.est and the q-axis current estimation value iq.est. In contrast, in a steady condition where the torque command value will remain unchanged, it is preferable that the current feedback control of the AC motor 13 be performed based on the smoothed d-axis current estimation value id.lpf and the smoothed q-axis current estimation value iq.lpf.

In the embodiment, the sensor phase is the W-phase. Alternatively, the sensor phase can be the U-phase or the V-phase.

Figure 9:
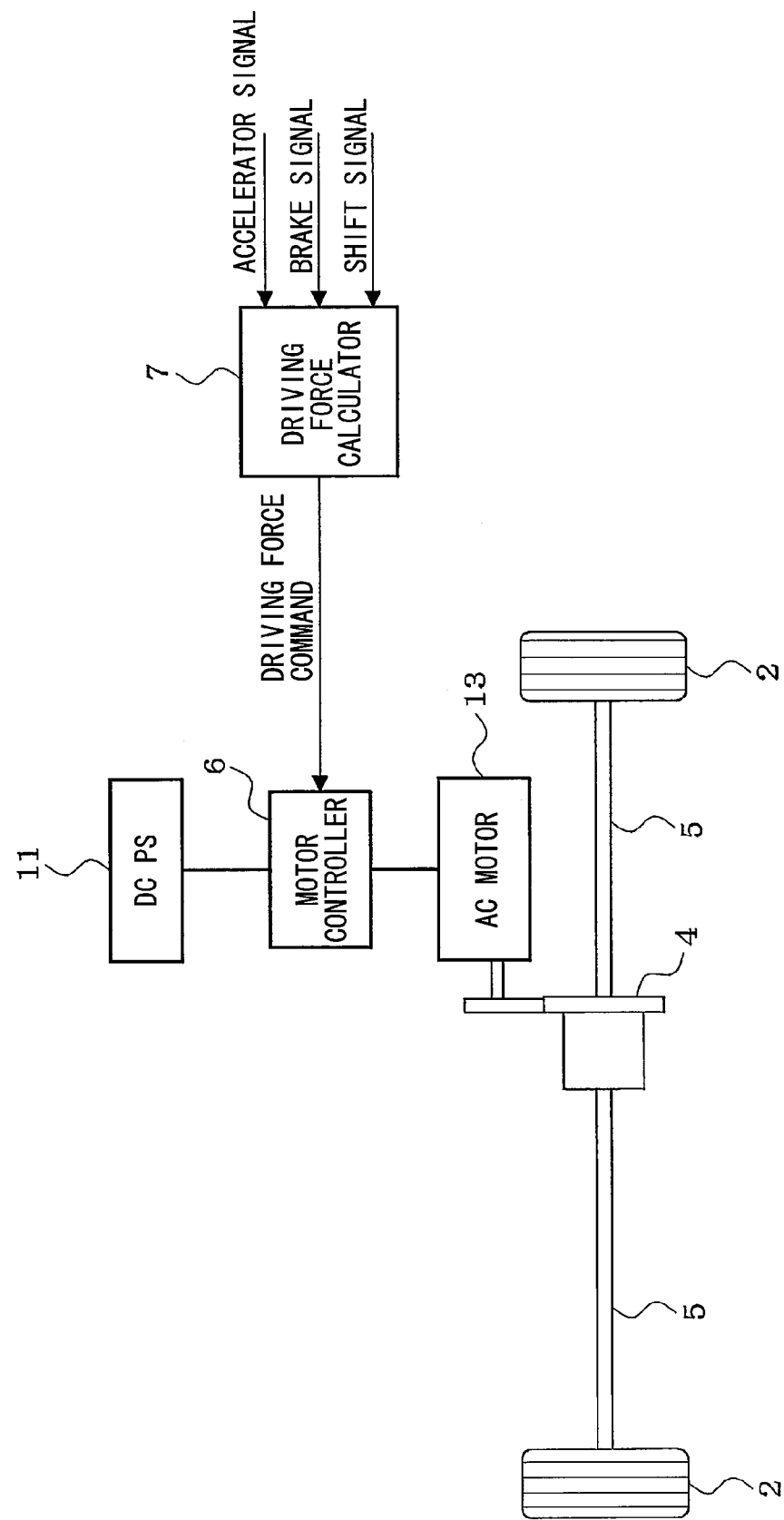
FIG. 9 is a block diagram of an electric vehicle driving system according to a modification of the embodiment.

The present disclosure can be applied also to a driving system of an electric vehicle such as shown in FIG. 9. Specifically, in the driving system of the electric vehicle shown in FIG. 9, the wheels 2 of the electric vehicle are driven by driving force of an AC motor 13. The AC motor 13 is connected to the DC power source 11, such as a rechargeable battery unit, through the motor controller 6. The motor controller 6 includes the inverter 12 (refer to FIG. 2) and the motor controlling circuit 16 (refer to FIG. 2). The AC motor 13 is supplied with electrical power from the DC power source 11 through the motor controller 6.

The driving force calculator 7 is provided by a computer that performs overall control of the electric vehicle. The driving force calculator 7 detects operating conditions of the electric vehicle based on signals received from sensors and switches. For example, the driving force calculator 7 can detect the operating conditions based on the brake signal from the brake sensor (not shown), the accelerator signal from the accelerator sensor (not shown), and the shift signal from the shift switch (not shown). The driving force calculator 7 exchanges control signals and data signals with the motor controlling circuit 16 (refer to FIG. 2), which controls operations of the AC motor 13. The driving force calculator 7 outputs a driving force command according to the operation conditions of the electric vehicle thereby controlling the driving force of the AC motor 13.

Even when the present disclosure is applied to the driving system of the electric vehicle such as described above, the current estimation accuracy of the AC motor 13 can be improved while satisfying the demand for the reduction in size and cost by using one current sensor 15 in one AC motor 13.

In the embodiment, the present disclosure is applied to a system including one set of an inverter and an AC motor. Alternatively, the present disclosure can be applied to a system including multiple sets of an inverter and an AC motor.

Figure 1:
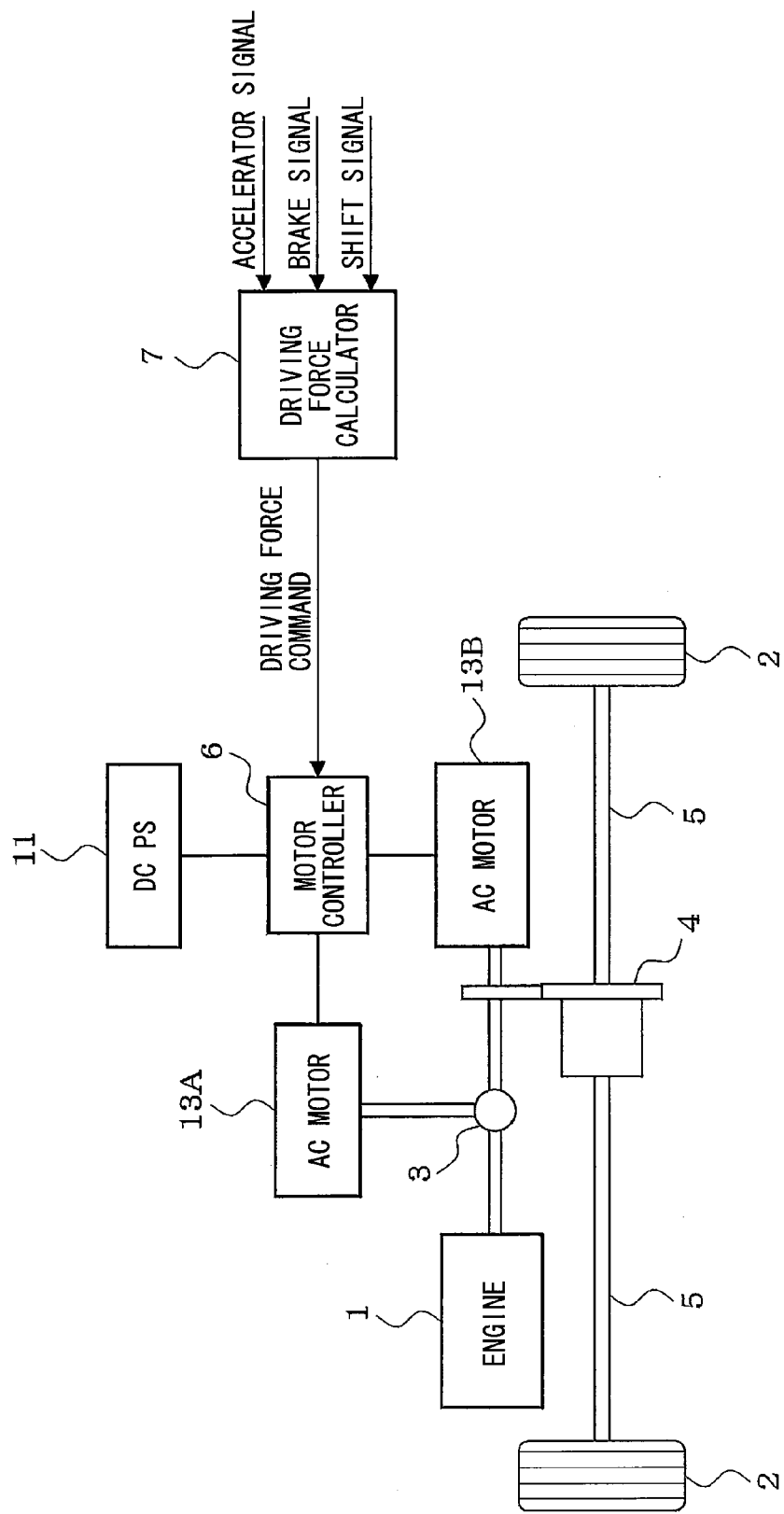
FIG. 1 is a block diagram of a hybrid vehicle driving system according to an embodiment of the present disclosure.

In the embodiment, the present disclosure is applied to the hybrid vehicle having a structure shown in FIG. 1 and the electric vehicle having a structure shown in FIG. 9. Alternatively, the present disclosure can be applied to an electric vehicle and a hybrid vehicle having another structure. Alternatively, the present disclosure can be applied to a control apparatus for controlling an AC motor used in an apparatus other than an electric vehicle and a hybrid vehicle.

What is claimed is:

1. A control apparatus for controlling a three-phase AC motor, the control apparatus comprising:
    a current sensor configured to detect electric current flowing through one phase of the AC motor, the one phase being defined as a sensor phase; and
    a current estimation section configured to repeatedly perform both dq transformation and inverse dq transformation in a predetermined calculation cycle, wherein
    in the dq transformation, a d-axis current estimation value and a q-axis current estimation value in a rotating coordinate system of the AC motor are calculated based on the current detected by the current sensor and a previous current estimation value of another phase of the AC motor previously calculated and stored in the memory, and
    in the inverse dq transformation, a present current estimation value of the other phase to be obtained at a time of angle advance of one period of the calculation cycle is calculated based on a smoothed d-axis current estimation value and a smoothed q-axis current estimation value into which the d-axis current estimation value and the q-axis current estimation value are respectively smoothed.

2. The control apparatus according to claim 1, wherein
    the current estimation section performs the inverse dq transformation by using a predicted electrical angle, and
    the predicted electrical angle is advanced with respect to a present electrical angle by one period of the calculation cycle.

3. The control apparatus according to claim 2, wherein
    the current estimation section calculates an electrical angle displacement for one period of the calculation cycle based on the calculation cycle and a rotation speed of the AC motor, and
    the current estimation section calculates the predicted electrical angle by adding the electrical angle displacement to the present electrical angle.

4. The control apparatus according to claim 1, further comprising:
    a control section configured to control energization of the AC motor based on the d-axis current estimation value and the q-axis current estimation value.

5. The control apparatus according to claim 2, further comprising:
    a control section configured to control energization of the AC motor based on the d-axis current estimation value and the q-axis current estimation value.

6. The control apparatus according to claim 3, further comprising:
    a control section configured to control energization of the AC motor based on the d-axis current estimation value and the q-axis current estimation value.

* * * * *